United States Patent [19]
Nishimura et al.

[11] Patent Number: 4,706,272
[45] Date of Patent: Nov. 10, 1987

[54] PAGING COMMUNICATION SYSTEM

[75] Inventors: Izumi Nishimura; Koichi Nagata, both of Tokyo, Japan

[73] Assignee: NEC Corporation, Japan

[21] Appl. No.: 697,334

[22] Filed: Feb. 1, 1985

[30] Foreign Application Priority Data

Feb. 14, 1984 [JP] Japan ................................. 59-24337

[51] Int. Cl.$^4$ ............................................. H01Q 7/00
[52] U.S. Cl. ....................................... 379/57; 379/63; 340/825.44; 340/825.52
[58] Field of Search ........................... 179/2 E, 2 CC; 340/825.07, 825.44, 825.52; 379/57; 455/54

[56] References Cited

U.S. PATENT DOCUMENTS

| | | | |
|---|---|---|---|
| 4,424,514 | 1/1984 | Fennell et al. | 340/825.52 |
| 4,427,980 | 1/1984 | Fennell et al. | 340/825.52 |
| 4,431,991 | 2/1984 | Bailey et al. | 340/825.52 |
| 4,517,561 | 5/1985 | Burke et al. | 340/825.07 |

*Primary Examiner*—Robert Lev
*Attorney, Agent, or Firm*—Laff, Whitesel, Conte & Saret

[57] ABSTRACT

A paging communication system is configured so that a plurality of receivers are called by group in response to a paging signal transmitted from a base station. The base station is provided with first circuitry comprising a plurality of timers for counting the number of transmissions to each receiver, and second circuitry operative to transmit a first kind of data indicating that the information code assigned to each of the particular receivers is masked and a second kind of data for restarting the ordinary receiving process with respect to the masked information code. Each receiver is provided with a decoder circuit operative in response to the first kind of data to inhibit the ordinary receiving process with respect to the masked code and operative in response to the second kind of data to restart the ordinary receiving process. Thus, the communication system will inhibit the information supply only to receivers which are not current in their contract payments and restart the information supply after payment of the contract fee. Further, this system can determine the appropriate charges based upon the number of calls to each individual calling number as counted by the first circuitry provided in the base station.

12 Claims, 9 Drawing Figures

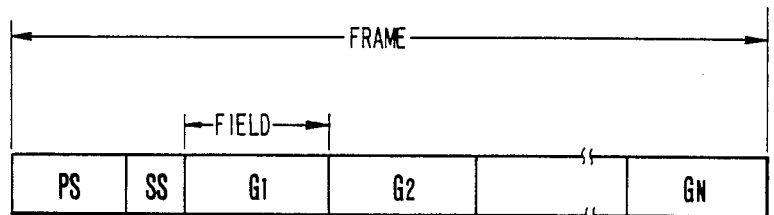
FIG. 1a
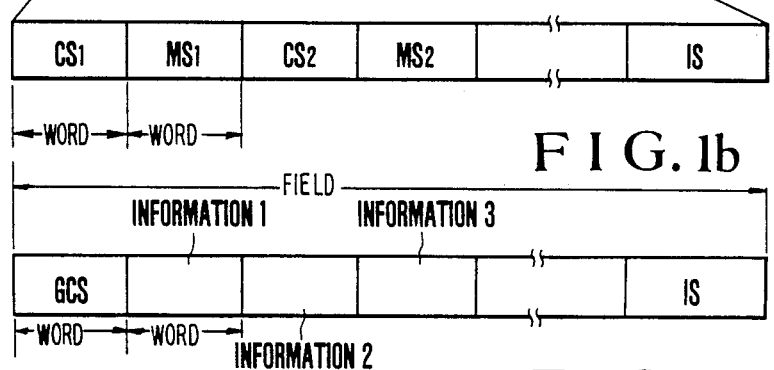
FIG. 1b
FIG. 1c
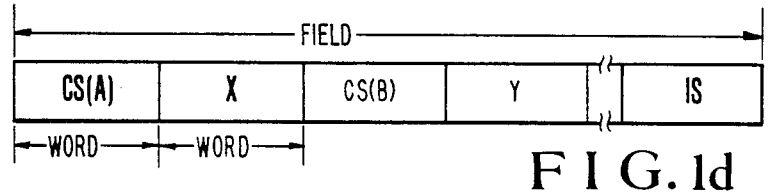
FIG. 1d

PAGING COMMUNICATION SYSTEM

BACKGROUND OF THE INVENTION

The present invention relates to a paging communication system adapted to transmit an individual calling code from a base station to receivers to effect communication therebetween, and more particularly to a paging communication system capable of supplying the same information to all receivers assigned to a particular group number.

In such a paging communication system, there are provided large numbers of receivers assigned to the same group number, to which information is supplied.

However, in the prior art, there has not been adopted a paging communication system for inhibiting the information supply to a particular receiver within the same group. Accordingly, the drawback with this system is that the information is supplied to a receiver which has not yet renewed a contract for using the paging communication system by paying a rental fee. Further, since a radio base station is not configured so as to count the number of individual calls, there is an inconvenience that the rental fee is determined with respect to all receivers as a monthly charge, i.e., a flat charge independent of the frequency of use.

SUMMARY OF THE INVENTION

With the above in view, an object of the present invention is to provide a paging communication system which can solve such problems encountered in the conventional paging communication system.

Another object of the invention is to provide a paging communication system which is configured so as to inhibit information supply only to receivers that have not yet renewed contracts for using the paging communication system by paying a rental fee and which may determine an amount of charge depending upon the frequency of calling of an individual calling number at the time of a renewal of a contract.

According to the present invention, the paging communication system comprises a base station and a plurality of receivers which are divided into a plurality of groups. The receivers are called by groups, in response to a paging signal which is transmitted from the base station. The paging signal is composed of a train of frames each of which includes a plurality of fields corresponding to the groups of receivers, respectively.

Each of the fields is composed of a plurality of pairs of an individual calling code word containing an individual calling code which is assigned to a corresponding one of the receivers and a message word containing a message addressed to the corresponding called receiver. The message word is subsequent to the individual calling code word.

Also, each field includes a group calling code word containing a group calling code which is common to all receivers in the same group of receivers and a plurality of information words each of which includes an information addressed to the group which is subsequent to the group calling code word. The base station comprises a first means for counting the number of times that a transmission is made from the base station to each of the receivers. A second means transmits first data indicating that the transmission of the information to a particular one or ones of the receivers is not allowed, by putting the first data in the message word corresponding to the particular one of the receivers or by putting the first data in each of the message words which corresponds to each of the particular ones of the receivers.

Each of the receivers comprises means for comparing the individual calling code which is transmitted from the base station with its own individual calling code which is stored therein. When the individual calling code which is received coincides with the stored individual calling code, a message to the corresponding receiver is indicated. The corresponding information is indicated when the group calling code that is received coincides with the receivers own group calling code, as stored therein. A third means is operative to inhibit an ordinary receiving processing of the information code in response to the first data transmitted from the base station.

The second means transmits a second data for causing the particular one or ones of receivers which are inhibited to receive the information and to restart the ordinary receiving processing of the information. This is done by putting the second data in the message word corresponding to the particular one of the receivers or by putting the second data in each of the message words which corresponds to each of the particular ones of the receivers.

The third means is operative in response to the second data to restart the ordinary receiving processing of the information transmitted from the base station.

BRIEF DESCRIPTION OF THE DRAWINGS

The features and advantages of a paging communication system according to the present invention will become more apparent from the following description taken in conjunction with the accompanying drawings, in which:

FIGS. 1a to 1d are diagrams showing examples of signal trains used in the present invention;

FIG. 3 is a block diagram illustrating an example of a control unit shown in FIG. 2a;

DETAILED DESCRIPTION OF PREFERRED EMBODIMENT

Figure 2A:
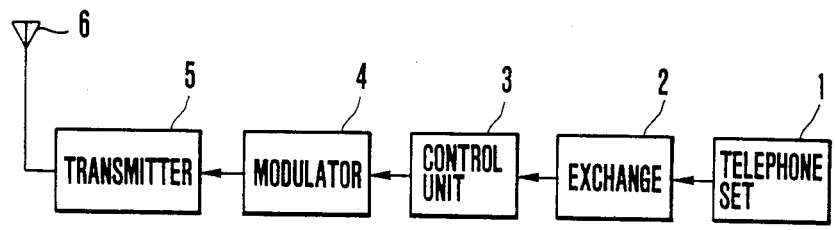
FIGS. 2a and 2b are block diagrams schematically illustrating an embodiment of a paging system according to the present invention.

A prefered embodiment of a paging communication system according to the present invention will be described with reference to attached drawings.

For facilitating the understanding of the present invention, a format of a paging signal transmitted from a radio base station to receivers which are divided into N groups will be first referred to. The paging signal is composed of a train of frames. FIG. 1a shows a construction of one frame of the paging signal.

As shown in FIG. 1a, each frame comprises a field for a preamble signal PS for a bit synchronization, a field for a synchronizing signal SS for a frame synchronization and N fields $G_1$ to $G_N$ assignd to the groups of subscriber receivers respectively.

The group field corresponding to each group ($G_1$ to $G_N$) includes a plurality of words as shown in FIGS. 1b and 1c. The field of the type shown in FIG. 1b comprises a plurality of calling code words containing calling codes $CS_1$, $CS_2$ . . . assigned to respective receivers, a plurality of message words containing message codes MS$_1$, MS$_2$ ... corresponding to respective calling codes CS$_1$, CS$_2$ ... subsequent to the corresponding calling code words, respectively, and a word containing an idle code IS for indicating the end of each group. The group field of the type shown in FIG. 1c comprises a word containing a group calling code GCS common to the receivers belonging to same group, a plurality of information words containing information 1, 2, ..., and a word containing an idle code IS for indicating the end of each group.

In the above-mentioned example, as shown in FIGS. 1b and 1c, the signal train corresponding to the individual number and the signal train corresponding to the common group number are separately shown. However, it is apparent that they may be transmitted as a single signal train.

Referring to FIG. 1d, there is shown an example of a signal train employed in the paging communication system according to the present invention. The group field in FIG. 1c comprises a calling code word containing a calling code CS(A) of a receiver A as an inhibit word containing an inhibit data X indicating that the transmission of the information to the receiver A is not allowed or inhibited so that the receiver A should inhibit an ordinary receiving processing of the information trasmitted from the base station, a calling code word containing a calling code CS(B) of a receiver B and a restart word containing a restart data Y indicating that the receiver B is allowed to restart the ordinary receiving processing of the information inhibited. As will be described later, in the paging communication system of the invention, a base station is provided with a control unit operative to transmit the inhibit data and restart data as a message code, and each receiver is provided with a decoder operative in response to the inhibit data to inhibit an ordinary receiving processing of the information transmitted from the base station and operative in response to the restart data to restart an ordinary receiving processing of the information inhibited. Thus, the communication system of the invention enables to inhibit information supply only to the receiver which has not yet completed the renewal of the contract for using the paging communication system by paying a fee.

To obtain such an advantage, the paging communication system according to the present invention is implemented as follows.

Figure 2B:
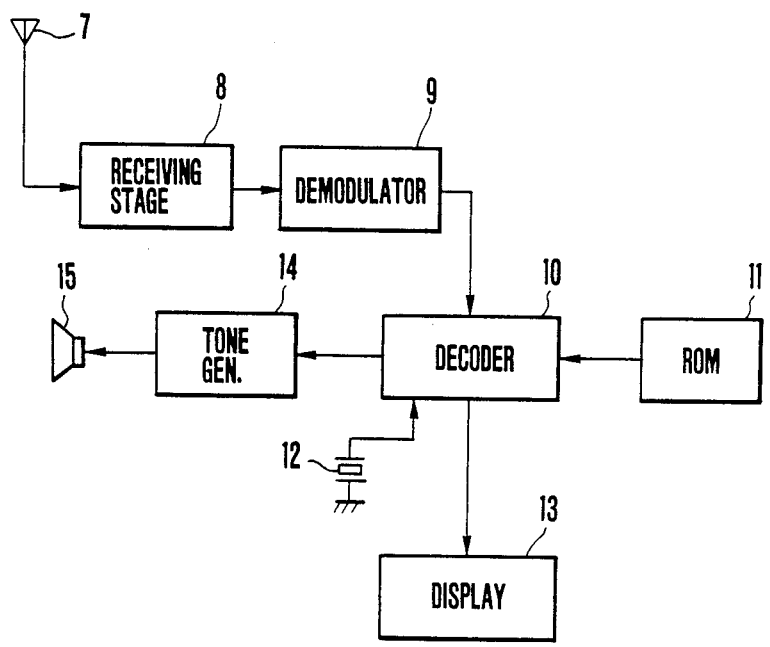

Referring to FIGS. 2a and 2b, there are shown in block form a radio base station and a receiver, respectively.

As shown in FIG. 2a, the radio base station comprises a telephone set 1, an exchange 2 connected to the telephone set 1, a control unit 3 adapted to receive an output from the exchange 2 and to convert the output into a coded output, a modulator 4 for modulating a carrier wave with the coded output from the control unit 3, and a transmitter 5 adapted to receive an output from the modulator 4 and to transmit it through an antenna 6. The control unit 3 has a device for counting calling numbers per individual receiver and is configured so that an information supply inhibit instruction or an information supply restart instruction can be inputted by a manual operation.

Referring to FIG. 2b, the receiver comprises a receiving stage 8 for receiving an arrival signal from antenna 7, a demodulator 9 for demodulating an output from the receiving stage 8, and a decoder 10 adapted to receive each of the outputs from the demodulator 9, a read only memory (ROM) 11 and a crystal oscillator 12 to compare a demodulated signal from the demodulator 9 with an individual calling code or a group calling code common to the same group stored in the ROM 11 and thereby to produce a predetermined output. The receiver further comprises a display 13 for indicating an output from the decoder 10, a tone generator driven by an output from the decoder 10 to generate an output indicative of a tone, and a speaker 15 which produces a sound in response to the output from the tone generator 14.

The operation of the embodiment shown in FIGS. 2a and 2b is described with reference to FIG. 1.

In the radio base station shown in FIG. 2a, a signal transmitted from the telephone set 1 passes through the exchange 2 and the signal is converted to a code in the control unit 3. The converted output from the control unit 3 is inputted to the demodulator 4 and then is transmitted via the transmitter 5 and the antenna 6.

On the other hand, in the receiver shown in FIG. 2b, a signal transmitted from the radio base station is received by antenna 7. The arrival signal is inputted to the demodulator 9 through the receiving stage 8. Thus, it is demodulated into a code in the demodulator 9 and a demodulated output is inputted to the decoder 10. When the demodulated signal is inputted to the decoder 10, it is compared with the individual calling number or the group calling number stored in advance in the ROM 11. As a result, when the demodulated signal coincides with the individual calling number, the decoder 10 produeces an output for allowing the tone generator 14 to operate, thereby producing a sound from the speaker 15 and indicating a message code MS (FIG. 1b) subsequent to the individual calling number on the display 15. When the demodulated signal coincides with the group calling number, information 1 and 2 etc. subsequent to the group calling number are indicated on the display 13.

The configuration of the control unit 3 in the base station shown in FIG. 2a and the operation thereof is described in detail with reference to a block diagram shown in FIG. 3.

Figure 3:
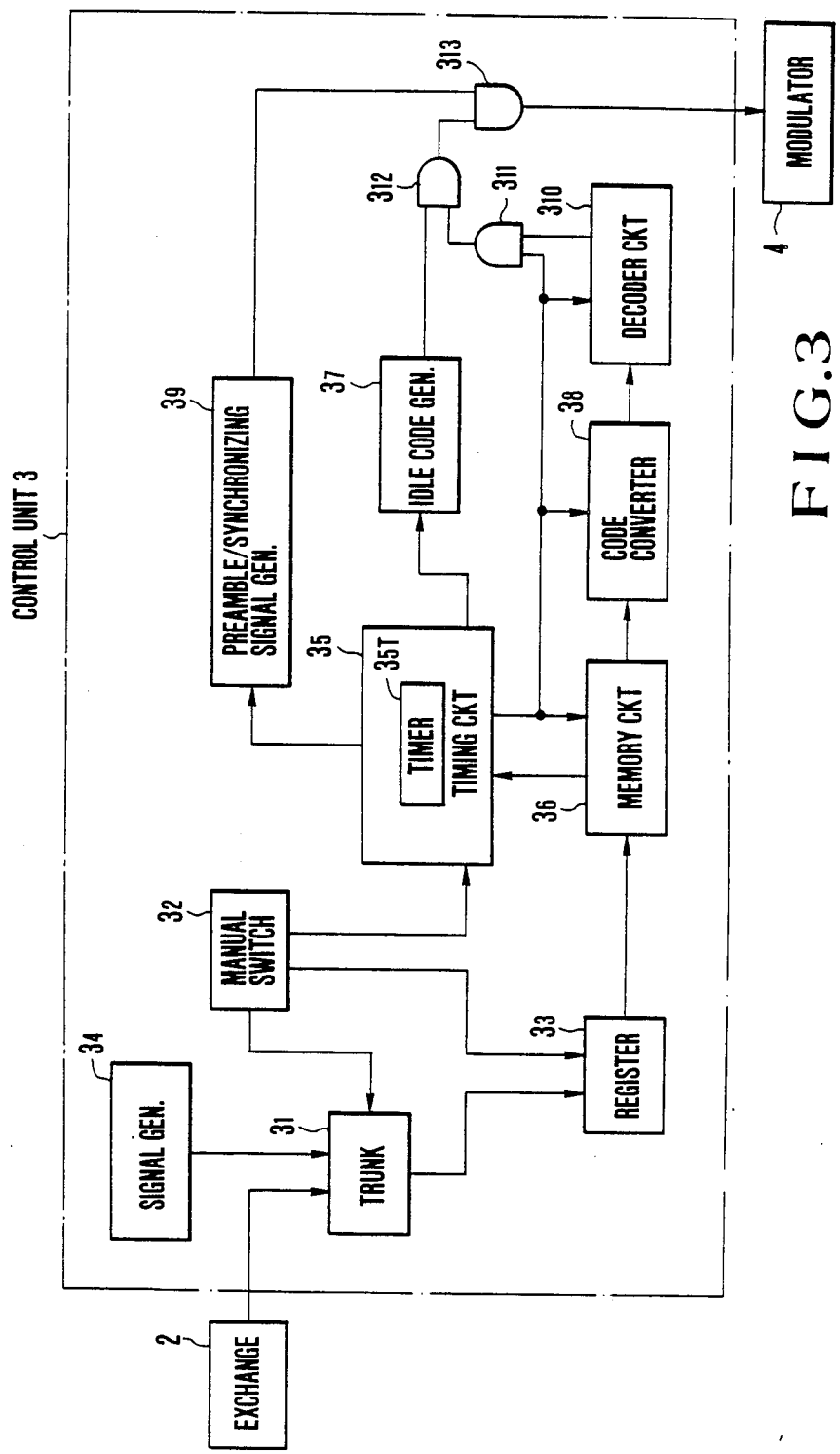

FIG. 3 shows parts extracted from those related to control unit 3 wherein the parts shown in FIG. 3 identical to the those shown in FIG. 2a are designated by the same reference numerals, respectively. The control unit 3 comprises a trunk circuit 3$_1$ adapted to receive an output from the exchange 2, a manual switch 3$_2$, a register 3$_3$ adapted to receive outputs from the trunk 3$_1$ and the manual switch 3$_2$, a signal generator 3$_4$ operative to produce signals, e.g., the group calling code CGS common to respective receivers, and information codes 1 and 2 etc. The control unit 3 further comprises a timing circuit 3$_5$ which is adapted to receive an output from the manual switch 3$_2$ and is provided with a plurality of timers 3$_{5T}$ assigned to respective receiver, which timers 3$_{5T}$ constitute means for counting the number of transmissions to each receiver, and a memory circuit 3$_6$ for storing an output from the register 3$_3$, which is configured so as to store calling number until a readout signal from the timing circuit 3$_5$ is received. The control unit 3 further comprises an idle code generator 3$_7$ operative to produce the idle code IS shown in FIGS. 1b, 1c and 1d in response to an output from the timing circuit 3$_5$, and a code converter 3$_8$ and an encoder circuit 3$_{10}$ which are controlled by an output from the timing circuit 3$_5$. The code converter 3$_8$ is configured so as to convert a BCD (Binary Coded Decimal) number into a binary code of 21 bits and the decoder circuit $3_{10}$ is configured so as to add a parity check bit of 10 bits to the information code of 21 bits to generate a calling number comprising BCH (Bose-Chaudhuri Hocquenghem) of a cyclic code (a parity check code of 10 bits and an information code of 21 bits). The control unit further comprises a preamble/synchronizing signal generator $3_9$ controlled by an output from the timing circuit $3_5$ to produce a preamble signal PS and a synchronizing signal SS for a frame synchronization shown in FIG. 1a, and AND gate $3_{11}$ for obtaining the logical product of an output from the timing circuit $3_5$ and an output from the encoder circuit $3_{10}$, an AND gate $3_{12}$ for obtaining the logical product of the output from the AND gate $3_{11}$ and an output from the idle code generator $3_7$, and an AND gate $3_{13}$ for obtaining the logical product of and output from the AND gate $3_{12}$ and an output from the preamble/synchronizing signal generator $3_9$. The AND gate $3_{13}$ is configured so that its output is transmitted to the modulator 4.

The operation of the control unit 3 shown in FIG. 3 described.

First, when a certain subscriber calls a paging receiver (which will be simply called a "receiver" hereinafter), a subscriber dials a calling number assigned to the receiver by means of a telephone set (FIG. 2a) of the subscriber. Thus, a signal indicative of a dial number is inputted to the trunk circuit $3_1$ of the control unit 3 via the telephone exchange 2 and then an output from the trunk circuit $3_1$ is inputted to the register $3_3$. It is to be noted that a signal indicative of a calling number may be inputted into the register $3_3$ by manually operating the manual switch $3_2$ by an operator (not shown). It is to be further noted that it is possible to hold a signal from the exchange 2 in the trunk circuit $3_1$ by making use of the manual switch $3_2$ in order to insert into the signal the group calling code GSC common to each receiver and the information codes 1 and 2 etc. shown in FIG. 1c.

Then, when the register $3_3$ receives a predetermined number of "CALLS" such as a dial signal, for instance, four CALLS, it transfers all calling numbers converted into BCD numbers to the memory circuit $3_6$. The memory circuit $3_6$ stores these calling numbers until a readout signal from the timing circuit $3_5$ is arrived. When the calling numbers are inputted into the memory circuit $3_6$, the timing circuit $3_5$ becomes operative so as to activate the preamble/synchronizing signal generator $3_9$, thereby to produce codes indicative of the preamble signal PS for bit synchronization and the synchronizing signal SS for frame synchronization, thus transmitting them to the modulator 4 through the AND gate $3_{13}$. Subsequent to the completion of transmission of codes indicative of the preamble signal PS for bit synchronization and the synchronizing signal SS for frame synchronization, the timing circuit $3_5$ becomes operative so as to output a reabout signal to the memory circuit $3_6$ and at the same time to activate the code converter $3_8$, encoder circuit $3_{10}$ and the AND gate $3_{11}$.

Assuming now that calling numbers are stored in the memory circuit $3_6$, they are transferred to the code convertor $3_8$ with each number being as a unit in order of storage in accordance with the readout signal from the timing circuit $3_5$ until the memory circuit $3_6$ becomes empty in its storage. Then, the code converter $3_8$ becomes operative to convert BCD number to binary information code of 21 bits. As previously mentioned, the encoder circuit $3_{10}$ becomes operative to add a parity chek bit train of 10 bits to the information code of 21 bits to output a calling number comprising BCH of cyclic code (the parity check code of 10 bits and the code information of 21 bits) to the modulator 4 through AND gates $3_{11}$, $3_{12}$ and $3_{13}$.

Then, when the memory circuit $3_6$ becomes empty in its storage, it outputs an output signal to the timing circuit $3_5$. In response to this output signal, the timing circuit $3_5$ allows the memory circuit $3_6$, the code converter $3_8$ and the encoder circuit $3_{10}$ to be inoperative, and at the same time activates the idle code generator $3_7$ to output the idle code IS (FIG. 1) to the modulator 4 through the AND gates $3_{12}$ and $3_{13}$.

Then, the timing circuit $3_5$ activates the timer $3_{5T}$ incorporated therein upon completion of signal transmission in the idle code generator $3_7$. When there is produced storage signal of a new calling number from the memory circuit $3_6$ within a setting time of the timer $3_{5T}$, the above-mentioned sequence of operations will be repeated. At this time, when a second storage signal or each of signals subsequent thereto, i.e., each of storage signals occuring subsequently to the first idle code IS is produced from the memory circuit $3_6$, the preamble/synchronizing signal generator $3_9$ is placed in the inoperative condition until the timer $3_{5T}$ expires in accordance with an output signal from the timing circuit $3_5$. On the other hand, after the timer $3_{5T}$ expires, the timing circuit $3_5$ does not produce any output signal as long as a new storage signal manner is not inputted to the memory circuit $3_6$.

Thus, a signal train as shown in FIG. 1a will be outputted in accordance with the above-mentioned sequence of operation.

It is to be noted that since timers $3_{5T}$ corresponding to respective individual receivers are provided in the timing circuit $3_5$, counting can be effected every time each individual number is outputted.

Then, the configuration of the decoder 10 provided in the receiver shown in FIG. 2b and the operation thereof is described in detail with reference to a block diagram shown in FIG. 4.

Figure 4:
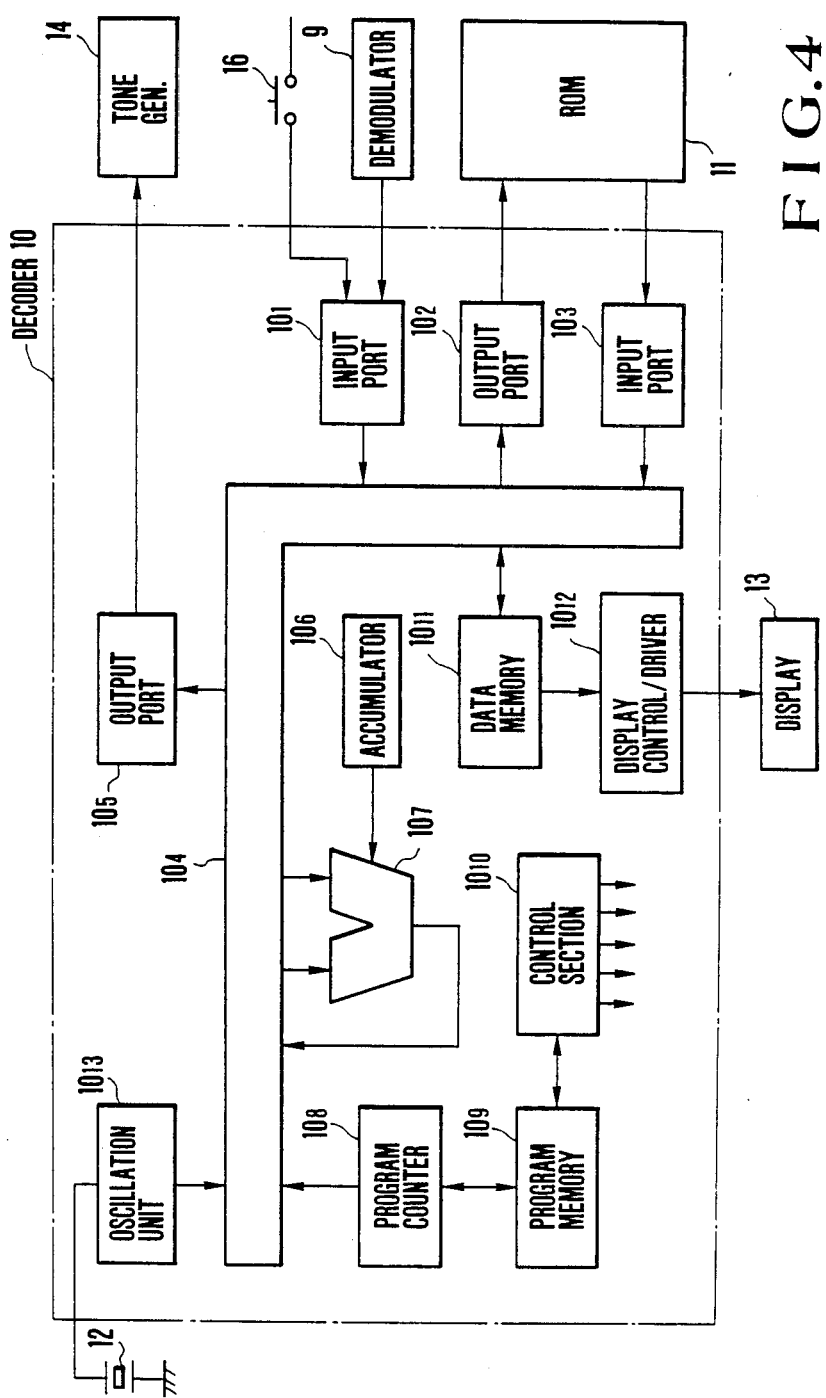
FIG. 4 is a block diagram illustrating an example of a decoder shown in FIG. 2b.

The parts shown in FIG. 4 identical to those shown in FIG. 2b are designated by the same reference numerals, respectively. In this embodiment, the decoder 10 is comprised of a one chip CPU. The decoder 10 comprises an input port $10_1$ which inputs a signal demodulated by the demodulator 9 to output the demodulated signal to a data bus $10_4$, an output port $10_2$ which inputs an instruction transferred via the data bus $10_4$ to output an instruction signal for reading a corresponding one of calling codes written in the ROM 11, and input port $10_3$ which inputs an output from, for example, ROM 11, receives the calling code read from the ROM 11 in accordance with the above-mentioned instruction signal to output the calling code thus read to the data bus $10_4$, and an output port $10_5$ to output a signal for activating the tone generator 14.

The decoder 10 further comprises an accumulator $10_6$, an arithmetic logic unit $10_7$ which inputs an output from the accumulator $10_6$ and an instruction transferred via the data bus $10_4$, and is operative to store a computed result into a memory to be referred to later, or to exchange data among the memory and I/O ports $10_1$, $10_2$, $10_3$ and $10_5$ through the data bus $10_4$, a program counter $10_8$, and a program memory $10_9$ in which an operational instruction train for performing a decoder function is written. The program memory $10_9$ transfers the content of an address corresponding to the program counter $10_8$ to a control section $10_{10}$. The control section $10_{10}$ is operative to decode instruction codes to be executed in accordance with the content from the program memory $10_9$ to effect each control of respective blocks for executing their instructions.

The decoder 10 further comprises a data memory $10_{11}$ and a display control/driver $10_{12}$. The data memory $10_{11}$ is configured so as to hold a signal transmitted from the input port $10_1$ through the data bus $10_4$ to display the content of the signal on the display 13 comprising a liquid crystal display (LCD) through a display control/driver $10_{12}$ for a predetermined period of time under the control of a timer (not shown) incorporated in the data memory $10_{11}$. The decoder 10 further comprises an oscillation unit $10_{13}$ cooperative with the crystal oscillator 12 to produce a timing clock signal for driving each block. There is further provided a switch 16 for initialization provided in association with the decoder 10. The switch 16 is connected to a power supply (not shown) through a resistor (not shown) to supply an output of logical "1" or "0" to the input port $10_1$.

Figure 5:
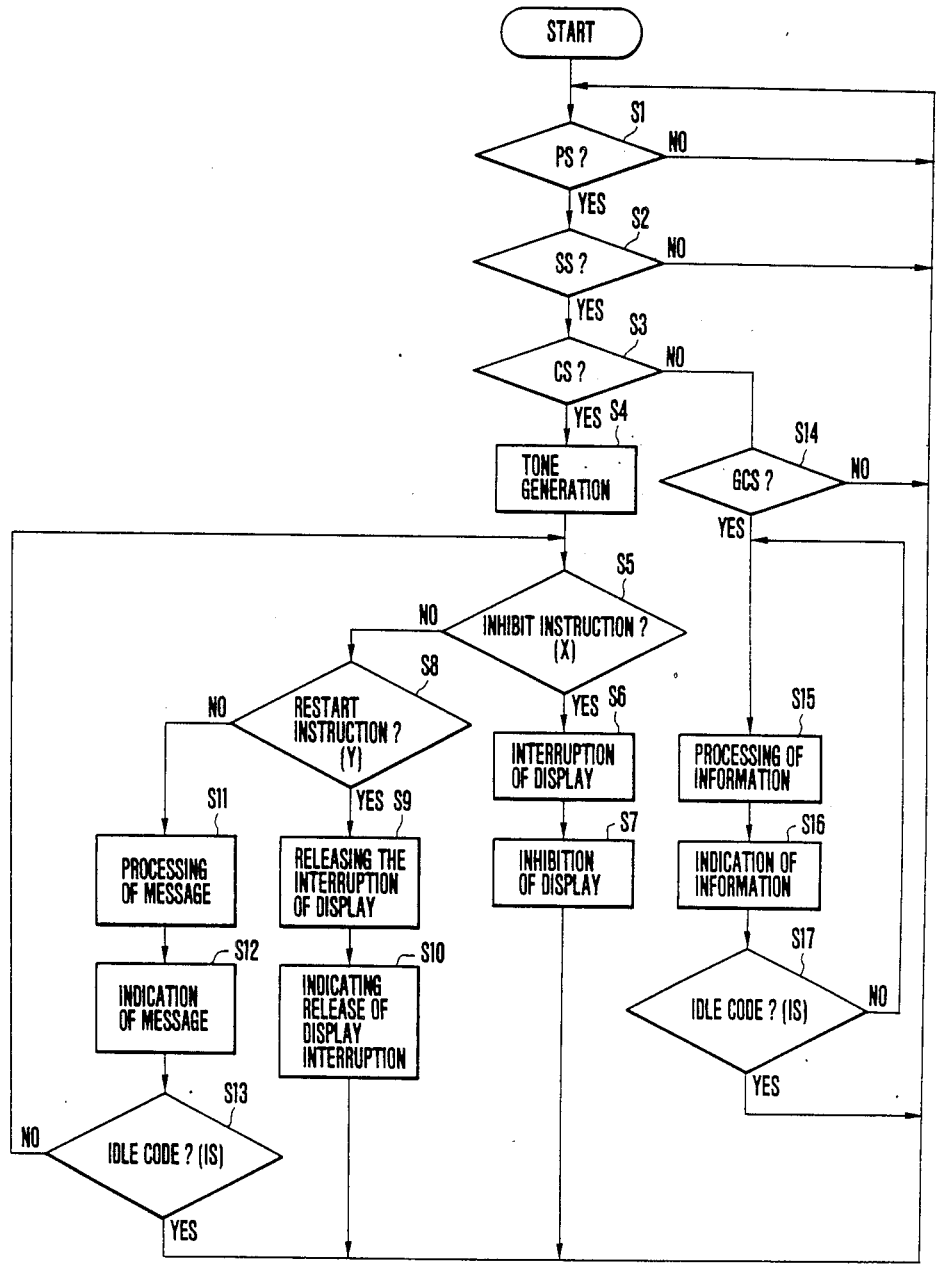
FIG. 5 is a flowchart showing the operation of the receivers shown in FIGS. 2b and 4.

The operation of the receiver thus configured is described in detail with reference to a flowchart shown in FIG. 5.

The flowchart shows an example of a receiving processing in the case where the receiver receives a signal from the radio base station.

First, judgement as to whether there exist the preamble signal PS for bit synchronization and the synchronizing signals SS for frame synchronization in the received signal are effected (steps $S_1$ and $S_2$). When either of the preamble signal PS and the synchronizing signal SS is not detected, the receiving process is returned to its initial state. When both signals PS and SS are detected, a judgement as to whether there exists the calling code (individual calling code) CS inherent in each receiver in the received signal is effected (step $S_3$). When the result of the judgement in the step $S_3$ is "YES", the tone generator 14 shown in FIG. 2b and FIG. 4 becomes operative, thereby allowing the speaker 15 to generate a tone output (step $S_4$). When the result of the judgement in the step $S_3$ is "NO", an judgement as to whether there exists the calling code common to each receiver (group calling code) GCS is effected (step $S_{14}$). When the result of the judgement is "NO" in the step $S_{14}$, the receiving processing is returned to the initial state.

Then, a message subsequent to the individual calling code CS is processed per one word as follows. Namely, a judgement as to whether the inhibit instruction (X) is present in the received signal is effected (step $S_5$). As a result, when the inhibit instruction (X) is included therein, an "interruption of display" is indicated (step $S_6$). The display is inhibited until a processing (step $S_9$) for releasing the "interruption of display" is completed, and then the receiving processing is returned to the initial state. When the result of the judgement in the step $S_5$ is "NO", a judgement as to whether the restart instruction (Y) is present in the received signal is effected (step $S_8$). When the result of the judgement in the step $S_8$ is "YES", a processing for releasing the interruption of display is executed (step $S_9$), to indicate a "release of display interruption" (step $S_{10}$), thereafter returning to the initial state. On the other hand, when the result of the judgement in the step $S_8$ is "NO", a processing for a corresponding message is executed (step $S_{11}$). Then, the message thus processed is indicated on the display 13 shown in FIG. 2b and FIG. 4. Then, a judgement as to whether the idle code IS is present in the received signal is effected (step $S_{13}$). As a result, when the idle code IS is absent in the received signal, the receiving process is returned to the step $S_5$ to repeatedly execute processing for a subsequent word in a manner stated above. In contrast, when the idle code IS is detected in the received signal in the step $S_{13}$, the receiving process is returned to the initial state.

Turning to the step $S_{14}$, a judgement as to whether the group calling code GCS common to each receiver is present is effected. As a result, when the group calling code GCS is detected, processing for the information 1 subsequent thereto shown in FIG. 1c is executed (step $S_{15}$) and the information 1 thus processed is indicated on the display 13 shown in FIG. 2b and FIG. 4 (step $S_{16}$). Then, a judgement as to whether the idle code IS is present is effected (step $S_{17}$). As a result, when the idle code IS is not detected in the step $S_{17}$, the receiving process is returned to the step $S_{15}$ to repeatedly carry out processing for a subsequent word in a manner stated above. In contrast, when the idle code IS is detected in the step $S_{17}$, the receiving process is returned to the initial state.

As is clear from the foregoing description, in the paging communication system comprising a base station and a plurality of receivers to be called in group according to the present invention, the base station is operative to transmit, as corresponding message codes, data indicating that an information code assigned to a particular one or each of the receivers is masked, and each of the receivers has a function of inhibiting the ordinary receiving process with respect to the masked information code in response to this data. Thus, the present invention makes it possible to inhibit information supply only with respect to receivers which is not renewed for contract fee. Further, in the paging communication system according to the present invention, the base station has the function of counting the number of transmission for each individual number, thus enabling it to determine the correct amount of charge for the calls of individual numbers at the time of renewal of the contract for using the paging communication system by paying a fee.

What is claimed is:

1. A paging communication system comprising:
    a base station; and
    a plurality of receivers divided into a plurality of groups, a group of said receivers being called in response to a paging signal transmitted from said base station;
    said paging signal being composed of a train of frames each of which includes a plurality of fields corresponding to said groups of receivers, respectively, each of said fields being composed of a plurality of pairs of an individual calling code word, each of said code words containing an individual calling code which is assigned to each corresponding ones of said receivers and a message word containing a message which is addressed to the corresponding receiver, said message word being subsequent to said individual calling code word, each of said code words also including a group calling code word containing a group calling code which is common to the same group of receivers and a plurality of information words each of which includes an information addressed to the group subsequent to said group calling code word;

said base station comprising first means for counting the number of times that a transmission is made from said base station to each of said receivers, and second means operative to transmit first data indicating that the transmission of the information to a particular one or ones of said receivers is not allowed by putting the first data in the message word corresponding to the particular one of said receivers or by putting the first data in each message word which corresponds to each of the particular ones of said receivers;

each of said receivers comprising means for comparing the individual calling code transmitted from said base station with its own individual calling code stored therein, means for indicating the corresponding message when the received individual calling code coincides with the stored individual calling code and for indicating the corresponding information when the received group calling code coincides with its own group calling code stored therein, and third means operative to inhibit an ordinary receiving processing of the information code in response to the first data transmitted from said base station.

2. A system as set forth in claim 1, wherein said second means is operative to transmit second data for causing the particular one or ones of inhibited receivers to receive the information to restart the ordinary receiving processing of the information, by putting the second data in the message word corresponding to the particular one of said receivers or by putting the second data in each of the message words which corresponds to each of the particular ones of said receivers.

3. A system as set forth in claim 2, wherein said third means is operative in response to the second data to restart the ordinary receiving processing of the information transmitted from said base station.

4. A system as set forth in claim 1, wherein a communication charge required for each of said receivers is determined in accordance with a counted value of said first means.

5. A system as set forth in claim 1, wherein said base station further comprises a control unit operative to convert a calling signal from each of a plurality of telephone sets through an exchange to a coded signal, a modulator for modulating a carrier wave with said coded signal, and a transmitter for transmitting said modulated carrier wave, said control unit being provided with said first and second means.

6. A system as set forth in claim 5, wherein said control unit comprises a timing circuit having a timer constituting said first means therein.

7. A system as set forth in claim 6, wherein said control unit further comprises memory means for storing data indicative of calling numbers, and encoder means for encoding said data indicative of calling numbers transferred from the memory means in synchronism with a timing signal from said timing circuit.

8. A system as set forth in claim 7, wherein said control unit further comprises a manual switch for inputting instructions for said first and second data, said instructions for said first and second data input from said manual switch being stored into said memory means, said timing circuit being responsive to an output of said manual switch.

9. A system as set forth in claim 8, wherein when a counted value obtained by the timer is above a predetermined value, said timing circuit outputs a readout signal to said memory means to transfer stored data corresponding to said first data to said encoder means thereby generating said first data.

10. A system as set forth in claim 8, wherein when said base station recognizes that a particular one or each of particular ones of the receivers has effected a renewal of a contract for using the paging communication system by paying a rental fee, said encoder means is operative to generate said second data.

11. A system as set forth in claim 8, wherein each receiver comprises a receiving stage for receiving said modulated coded signal, a demodulator for demodulating said modulated carrier wave into a coded signal, and a decoder for decoding said coded signal into a signal, thereby indicating said message code and information code or sounding a tone, said third means being provided in said decoder.

12. A system as set forth in claim 8, wherein said decoder is comprised of a one chip CPU operative to effect message processing to indicate a corresponding message code when both said first and second data are not detected in a received signal, to indicate an interruption of a display for a corresponding message code when said first data is detected in a receiver signal, and to indicate release of said interruption of a display for said corresponding message code when said first data is not detected and said second data is detected.

* * * * *